United States Patent [19]
Fukuchi et al.

[11] Patent Number: 5,570,194
[45] Date of Patent: Oct. 29, 1996

[54] COLOR IMAGE FORMING APPARATUS IN WHICH PRE-TRANSFER IMAGE EXPOSURE IS PERFORMED ON FULL COLOR TONER IMAGE ON PHOTORECEPTOR AFTER FOURTH COLOR TONER IMAGE OF Y,M,C, AND BK COLOR TONER IMAGES IS FORMED BUT BEFORE TRANSFERRING FULL COLOR TONER IMAGE

[75] Inventors: Masakazu Fukuchi; Satoshi Haneda; Shizuo Morita, all of Hachioji, Japan

[73] Assignee: Konica Corporation, Tokyo, Japan

[21] Appl. No.: 154,748

[22] Filed: Nov. 18, 1993

[30] Foreign Application Priority Data

Nov. 26, 1992 [JP] Japan ................................ 4-317353

[51] Int. Cl.$^6$ ............................. H04N 1/29; G03G 15/01
[52] U.S. Cl. ............................................. 358/300; 355/327
[58] Field of Search ..................................... 358/296, 300, 358/406, 483, 501, 504, 505, 513, 514, 524; 355/271–274, 326 R, 327; 347/115, 129, 130, 133, 140, 184, 189, 232, 233

[56] References Cited

U.S. PATENT DOCUMENTS

| 4,825,246 | 4/1989 | Fukuchi et al. | 358/300 X |
| 4,959,669 | 9/1990 | Haneda et al. | 358/300 X |
| 5,038,177 | 8/1991 | Parker et al. | 355/273 |
| 5,172,132 | 12/1992 | Haneda et al. | 358/296 X |
| 5,184,146 | 2/1993 | Tanaka et al. | 358/296 X |
| 5,293,207 | 3/1994 | Haneda | 355/327 |

FOREIGN PATENT DOCUMENTS

| 59-181362 | 10/1984 | Japan . |
| 60-76766 | 5/1985 | Japan . |
| 62-52565 | 3/1987 | Japan . |

OTHER PUBLICATIONS

Patent Abstracts of Japan, vol. 9, No. 157 (P–369) (1880), Jul. 2, 1985 & JP–A–60 032 068 (Canon K.K.) Feb. 19, 1985.
Patent Abstracts of Japan, vol. 9, No. 72 (P–345) (1795), Apr. 2, 1985 & JP–A–59 204 078 (Konishiroku Shashin Kogyo K.K.) Nov. 19, 1984.
Patent Abstracts of Japan, vol. 14, No. 15 (P–989), Jan. 12, 1990 & JP–A–01 261 686 (Ricoh Co., Ltd.) Oct. 18, 1989.
Patent Abstracts of Japan, vol. 10, No. 382 (P–529), Dec. 20, 1986 & JP–A–61 172 159 (Konishiroku Photo Co., Ltd.) Aug. 2, 1986.

Primary Examiner—Peter S. Wong
Assistant Examiner—Eric Frahm
Attorney, Agent, or Firm—Frishauf, Holtz, Goodman, Langer & Chick

[57] ABSTRACT

An apparatus for forming Y, M, C, and BK color toner images, includes a controller to control an exposure device to conduct a pre-transfer image exposure on the color toner images on the photoreceptor on the basis of recording signals after the final color toner image formation of the Y, M, C, and BK color toner images before transferring the color toner images.

6 Claims, 11 Drawing Sheets

PRE-TRANSFER EXPOSURE (EXPOSURE ON A TONER PORTION EXCEPT THE FINAL TONER PORTION)

PRE-TRANSFER EXPOSURE
(ENTIRE SURFACE)

COLOR IMAGE FORMING APPARATUS IN WHICH PRE-TRANSFER IMAGE EXPOSURE IS PERFORMED ON FULL COLOR TONER IMAGE ON PHOTORECEPTOR AFTER FOURTH COLOR TONER IMAGE OF Y,M,C, AND BK COLOR TONER IMAGES IS FORMED BUT BEFORE TRANSFERRING FULL COLOR TONER IMAGE

BACKGROUND OF THE INVENTION

The present invention relates to a color image forming apparatus such as an electrophotographic copier in which: an electrostatic latent image of a document is formed on a photoreceptor (an image forming body); the formed electrostatic latent image is developed into a visual color image (a toner image); and the visual image is transferred onto and fixed on a transfer sheet, using an electrophotographic system.

In the color image forming apparatus using the electrophotographic method or an electrostatic recording method, the electrostatic latent image is formed on the image forming body according to a document image, and the latent image is developed by toners which are charged particles. The above principle is used as follows so that a color image and a synthesized image (superimposition of a plurality of documents or image information on an image of a document) can be obtained. That is, the principle is realized when a cycle of charging, image exposing and developing operations are repeatedly conducted more than two times on the image forming body having a photoconductive layer on a conductive base plate (for example, Japanese Patent Application No. 184381/1983).

In this image forming method, a color developing operation or an image synthesizing operation can be conducted, and the superimposed toner image can be transferred onto the transfer sheet by one transfer process, and therefore, the apparatus, in which the color image or synthesized image can be obtained by a simple structure, can be realized.

As a developing method by which the image forming process is realized, it is necessary that the developing is conducted, for example, using a developer composed of non-magnetic toner and magnetic carrier under the condition disclosed in Japanese Patent Applications No. 57446/1983, and 192712/1985. In a developing device, the following operations are carried out: developer is stirred and toner is, for example, negatively charged; the charged toner adheres to the magnetic carrier surface due to electrostatic force; the developer, in which the toner is electrostatically coupled with the carrier, is magnetically attracted to the surface of a developing sleeve; and the sleeve is rotated at a predetermined linear velocity while the developer is being held on the surface of the sleeve, and conveys the developer to a developing area. Although this developing method is a kind of magnetic brush developing method, the magnetic brush does not contact the image forming body. This method has the following characteristics in which: only the toner is scattered onto a latent image portion according to the document image on the image forming body when a DC bias voltage is supplied or when DC and AC bias voltages are superimposed.

A color image forming apparatus, in which the latent image is formed by a latent image forming means for each color and developed by the developing device in which the color toner corresponding to each latent image is used, is provided as the image forming apparatus to which the foregoing image forming process and developing method are applied.

In the color image forming apparatus, the following apparatus is typically used in which the electrostatic latent image is formed by emitting a light beam, such as a laser beam, on the image forming body (which will be called the photoreceptor, hereinafter) having photoconductive material on the conductive base plate. Alternatively, the laser may also be replaced with an LED, and the emitting fore end of the LED is covered or uncovered with a liquid crystal shutter.

In this type of color image forming apparatus, a color toner image is formed in a toner image forming process shown in FIG. 9(a) to FIG. 9(f).

FIGS. 9(a) to 9(f) are explanatory drawings showing the toner image forming process in which image exposing and developing operations are repeatedly conducted on the photoreceptor according to a document image, and toner images are superimposed on the photoreceptor.

Figure 9:
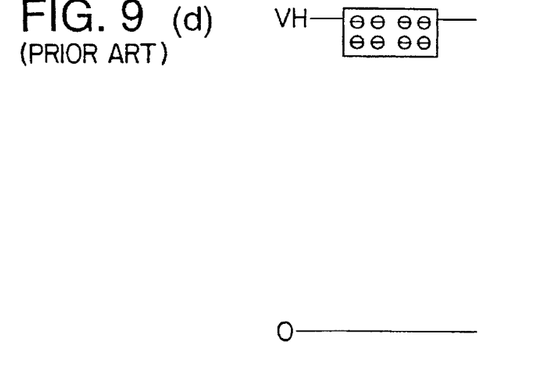
FIGS. 9(a) to 9(f) are views showing the potential distribution of the conventional toner image forming process by which toner images are superimposed on the photoreceptor when the charging, image exposing and developing operations are repeatedly conducted.
Figure 9A:
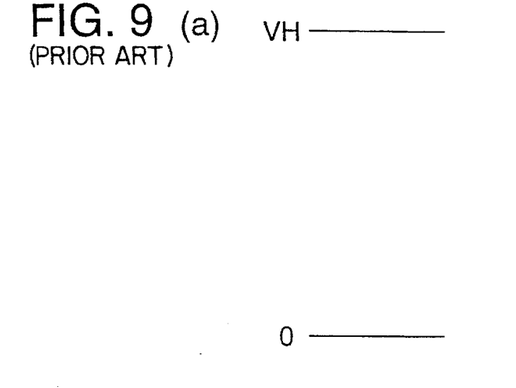

The photoreceptor is uniformly charged when a charger conducts a corona discharge as shown in FIG. 9(a), so that the surface potential of the photoreceptor is uniformly increased up to the surface potential $V_H$.

Figure 9B:
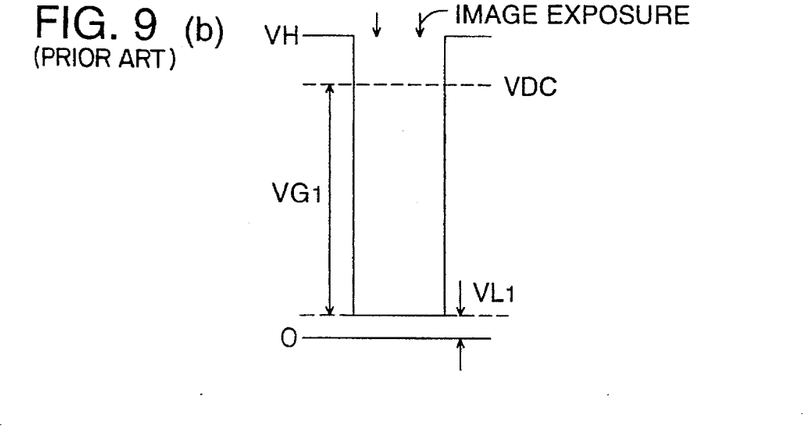
Figure 9C:
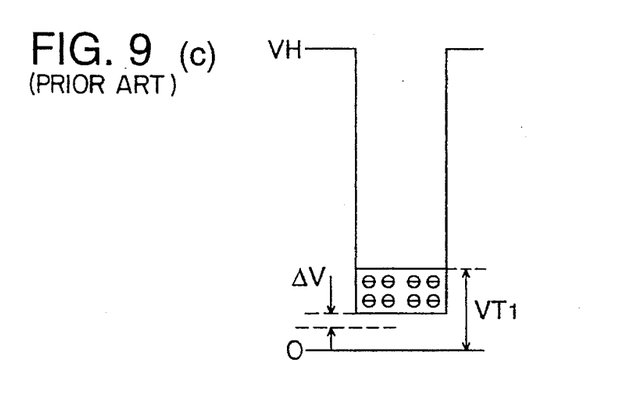

A laser exposing device emits a laser beam and forms the electrostatic latent image on the photoreceptor surface. At this time, the surface potential of the photoreceptor surface on which the electrostatic latent image is formed is decreased from the surface potential $V_H$ to the surface potential $V_{L1}$ as shown in FIG. 9(b). This surface potential of the photoreceptor $V_{L1}$ is that of the electrostatic latent image which was formed initially, and it is defined as an exposure potential $V_{L1}$. The surface potential of the electrostatic latent image formed on the photoreceptor surface is determined by the intensity of the laser beam. Thereby, a developing potential gap $V_{G1}$ is generated which is a potential difference between the surface potential $V_{DC}$ of the developing sleeve produced by a DC component of a bias voltage impressed from a developing bias circuit of the developing device, and the exposure potential $V_{L1}$. This developing potential gap $V_{G1}$ contributes to the next development. Because an electric field generated by this developing potential gap $V_{G1}$ is directed from the surface of the latent image on the photoreceptor surface to the surface of the developing sleeve, toner particles, which are negatively charged particles, are attracted by an electric force directed to a latent image portion of the photoreceptor surface. However, the electric force is not so strong as the toner particles, which are electrostatically coupled particles, and are separated from the magnetic carrier. On the other hand, the developer, which is held on the surface of the developing sleeve by magnetic force, is scattered from the developing sleeve to the $V_{L1}$ portion of the photoreceptor and adhered to the electrostatic latent image by an electrostatic force, because a large force is further supplied to the developer when the polarity of an AC component of the bias voltage impressed from the developing bias circuit is the same as that of a DC component. Due to the foregoing, the first toner image can be obtained when the latent image on the surface of the photoreceptor, onto which the negatively charged toner particles are electrostatically adhered, is developed (reversal development). At this time, the surface potential of the first toner layer adhered to the electrostatic latent image on the photoreceptor surface is the same as the toner layer surface potential $V_{T1}$ as shown in FIG. 9(c).

Next, the photoreceptor surface on which the toner layer has been formed by the foregoing first development is uniformly charged again so that the surface potential of the photoreceptor is the surface potential $V_H$ when the charger conducts a scorotron discharge, and is ready for the next latent image forming process. At this time, a potential distribution of the photoreceptor surface which is approximately uniformly charged is shown in FIG. 9(d), and the surface potential of the photoreceptor is equal to $V_H$.

The laser exposure device conducts the second image exposure and the second latent image is formed on the surface of the photoreceptor. The potential distribution of the photoreceptor surface at this time is shown in FIG. 9(e). The surface potential of the photoreceptor by the first image exposure is decreased from $V_H$ to the exposure potential $V_{L1}$ as described above. The surface potential of the photoreceptor by the second image exposure is decreased from $V_H$ to the re-exposure potential $V_{L2}$. The surface potential of the toner layer formed on the surface of the photoreceptor is decreased from the potential which is close to $V_H$ to the potential $V_{T2}$. Here, a developing potential gap $V_{G1}$, which is a potential difference between the surface potential $V_{DC}$ of the developing sleeve and the exposure potential $V_{L1}$, is generated, and a developing gap $V_{G2}$, which is a potential difference between the surface potential $V_{DC}$ of the developing sleeve and the re-exposure potential $V_{L2}$, is generated. Although these developing potential gaps $V_{G1}$ and $V_{G2}$ contribute to the next development, the electric force generated only by the electric field due to the developing potential gaps $V_{G1}$ and $V_{G2}$ as described above is not so strong as charged toner particles coupled by the electrostatic force are separated from the magnetic carrier. Also in this case, the force to carry the toner to the photoreceptor is sufficiently large when the polarity of the AC component of the bias voltage impressed from the developing bias circuit is the same as that of the potential gap due to $V_{G1}$ and $V_{G2}$, so that the toner is scattered and adhered to the photoreceptor. Due to the foregoing, when negatively charged toner particles are electrostatically adhered to the latent image on the photoreceptor surface as shown in FIG. 9(f), and the latent image is developed (reversal development), the second toner layer can be obtained.

A color toner image can be obtained on the photoreceptor when the foregoing processes are repeatedly conducted if necessary. A charging operation, in which the charging polarity is opposite to the toner charging polarity, is conducted by a transfer device from the back of the transfer sheet which is in contact with the toner images, and the toner images are collectively transferred onto the transfer sheet. Further, the transfer sheet is heated and pressurized, so that a color image can be obtained.

Figure 10:
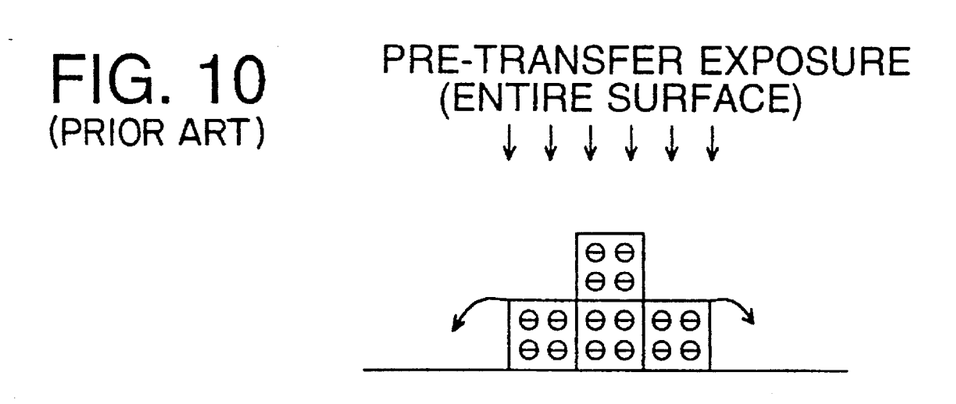
FIG. 10 is a view showing the potential distribution when an entire surface exposure operation is conventionally conducted before transfer.

In the foregoing transferring operation of the toner image onto the transfer sheet, it is difficult to provide the transfer sheet with a uniform insulation property when humidity becomes high, so that the insulation property of the transfer sheet is partially lowered. Then, transition of electric charges occurs between the transfer sheet and the photoreceptor, and transfer charges are lost. As a result, transfer efficiency is partially lowered, and undesirable nonuniform transfer occurs as if the toner layer were partially torn away. The potential voltage of the color toner image developed by a plurality of color toners on the photoreceptor is approximately equal to that of a non-image portion by means of re-charging except the final color toner image. Accordingly, the potential voltage of a color toner section is irregular, and nonuniformity of transfer easily occurs. A pre-transfer exposure method has been proposed in which the entire surface of the photoreceptor is uniformly charged before transfer in order to prevent the nonuniformity of transfer after all developments have been completed. It was experimentally discovered that the nonuniformity of transfer can be prevented when the pre-transfer exposure process is conducted. However, as shown in FIG. 10, because toner particles are charged to the same polarity, toner particles of end portions of the toner image are scattered around the toner image by repulsive forces, so that the image is stained and image resolution is lowered, which is undesirable. This can be explained as follows. At the time of development, as shown in FIG. 9(c) and FIG. 9(f), the toner image is formed in an electrical potential-well, and therefore, the repulsive force generated by the toner charges is included and left in the potential-well as it is. When electric charges around the toner image are discharged, the potential of the toner image portion extends from the potential-well, and when some toners scatter around the toner image, the repulsive force generated by toner particles is released. Accordingly, the pre-transfer exposure method, by which the entire surface of the photoreceptor is uniformly exposed before transfer, is not a complete solution of the problem.

Accordingly, in order to prevent inferior transfer at the time of high humidity, it is necessary that a heater is provided in the apparatus, and an increase of the humidity of the transfer sheet and the transfer belt is prevented by the heater. Accordingly, the following problems occur: the apparatus becomes complicated; and specially processed and expensive transfer material should be used so that the humidity does not affect the apparatus.

An object of the present invention is to solve the foregoing problems and to provide a color image forming apparatus in which a document image is read out and a color image is formed, wherein the apparatus is not complicated; inferior transfer does not occur even at the time of high humidity; and an image with superior quality can be stably obtained.

SUMMARY OF THE INVENTION

The object of the present invention is accomplished by ① a color image forming apparatus provided with: a reading device in which an optical image obtained by optical scanning of a document is color-separated into three colors of B, G, and R, and after that, they are converted into electrical signals; a signal processing means by which the electrical signals are processed and converted into recording signals of four colors of Y, M, C and BK; and a toner image forming means by which an image exposure operation is conducted on a photoreceptor according to the recording signals so that Y, M, C, and BK latent images are successively formed, and the latent images are respectively developed by Y, M, C, and BK toners so that a color toner image can be formed on the photoreceptor, wherein the color toner image is formed in synchronization with four individual optical scanning operations, and the apparatus is provided with a control means by which the image exposure operation is conducted on the photoreceptor from above the color toner image according to an image exposure signal formed by the recording signal. Further the object of the present invention is accomplished by ② a color image forming apparatus provided with: the reading device in which an optical image obtained by optically scanning the document is color-separated into three colors of B, G, R and after that, these colors are respectively converted into electric signals; the signal processing means by which the electric signals are processed and converted into recording signals of four colors Of Y, M, C and BK; a memory means by which the recording signals of four colors of Y, M, C and BK are stored in a page memory; the toner image forming means by which an image exposure operation is conducted on a photoreceptor according to the recording signals so that Y, M, C, and BK latent images are successively formed, and the latent images are respectively developed by Y, M, C, and BK toners so that a color toner image can be formed on the photoreceptor, and the control means by which the image exposure operation is conducted on the photoreceptor from above the color toner image according to an image exposure signal formed by the recording signal.

In a color image forming apparatus according to the present invention, the following operations are conducted: the document information read out by the reading device is converted into recording signals; an image exposure operation is conducted on the photoreceptor so that latent images are formed; the latent images are developed so that color toner images are formed; and the color toner images are transferred onto a transfer sheet. Prior to the transfer operation, a pre-transfer exposure on the toner portion is conducted according to the image exposure signal with respect to a portion on which toner images exist, and one of the following two systems of the pre-transfer exposure on the toner portion A and B is conducted.

Figure 7:
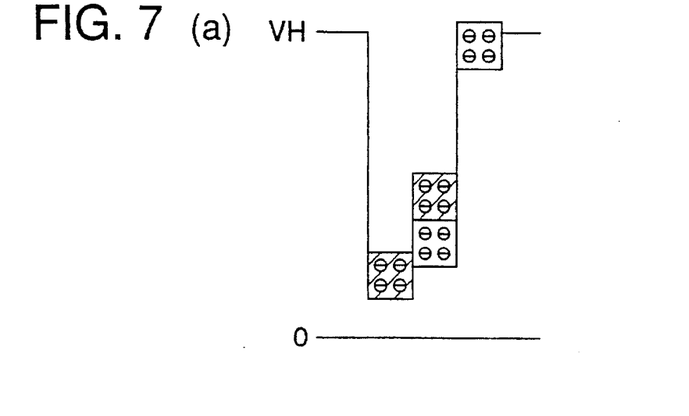
FIGS. 7(a), 7(b) and 7(c) are views showing the distribution of the surface potential of a photoreceptor after a re-charging operation has been conducted after development, and after an exposure operation has been conducted on the toner portion after development, according to the present invention.

FIGS. 7(a)–7(c) show the condition of the potential distribution when the pre-transfer exposure operation on the toner portion is conducted in A system. FIG. 7(a) shows the potential distribution of the color toner layer formed on the photoreceptor by a plurality of times of color image forming processes. FIG. 7(b) shows the condition in which the photoreceptor having thereon the color toner layer is uniformly charged again by the charger. FIG. 7(c) shows the condition in which the pre-transfer exposure operation is conducted only on that portion, on which the toner images exist, according to all the image data by which the latent image has been formed up to that time, after the photoreceptor has been uniformly charged again as shown in FIG. 7(b). In FIG. 7(b), the photoreceptor surface potential around the toner image is maintained to be $V_H$ so that the toner is not scattered at the time of transfer. In this system, the charging operation, by which the photoreceptor is uniformly charged again, may be omitted.

Figure 8:
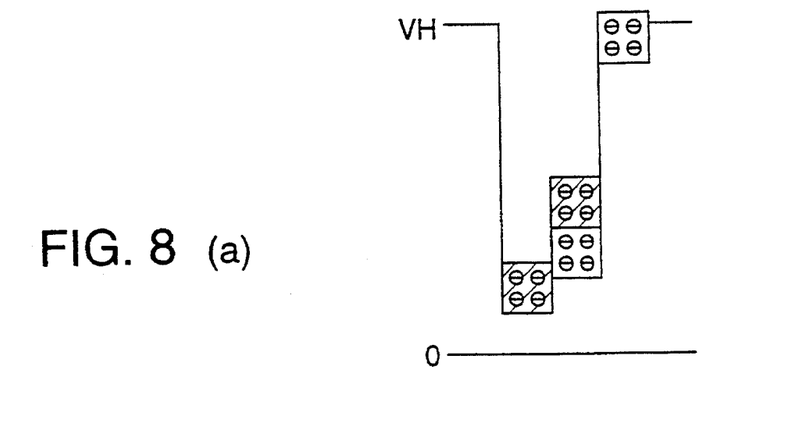
FIGS. 8(a) and 8(b) are views showing the distribution of the surface potential of the photoreceptor when the re-exposure operation is conducted on the image portion except the finally formed toner image after the developing operation has been conducted according to the present invention.

FIGS. 8(a)–8(b) show the condition of the potential distribution when the pre-transfer exposure operation on the toner portion is conducted in B system. FIG. 8(a) shows the potential distribution of the color toner layer, which is formed on the photoreceptor by a plurality of times of the color image forming processes, and on a portion of which toner images are superimposed. In FIG. 8(b), the uniform re-charging operation is not conducted on the color toner image, and the pre-transfer exposure operation on the toner portion is conducted on only an image portion except the finally formed toner image. Accordingly, the area, on which the re-exposure operation is conducted, is small, and the potential of the image portion becomes uniform while the generation ratio of toner scattering is reduced. Therefore, the transfer operation can be conducted stably and highly efficiently.

DETAILED DESCRIPTION OF THE PREFERRED EMBODIMENT

Figure 1:
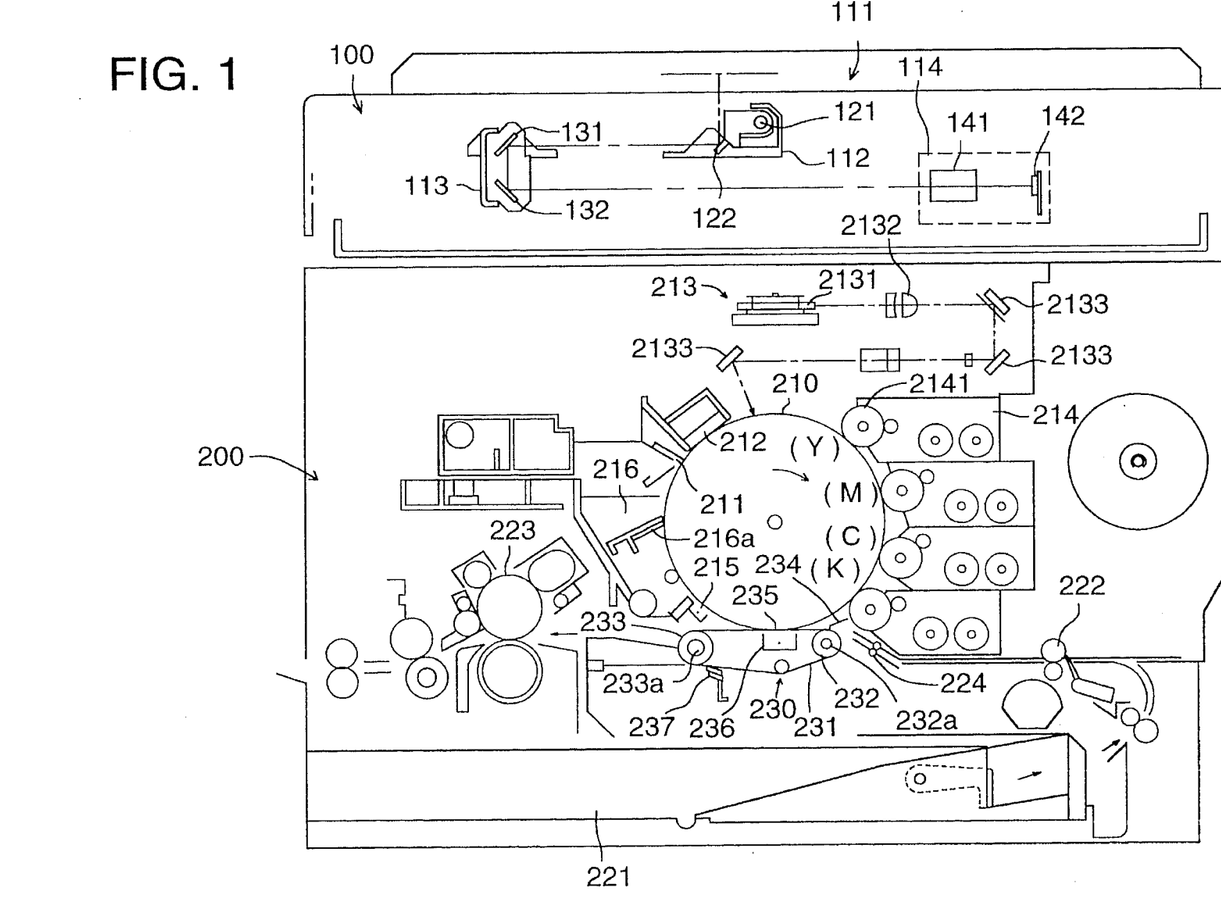
FIG. 1 is a view showing the main structure of a color image forming apparatus according to the first invention of the present invention.
Figure 2:
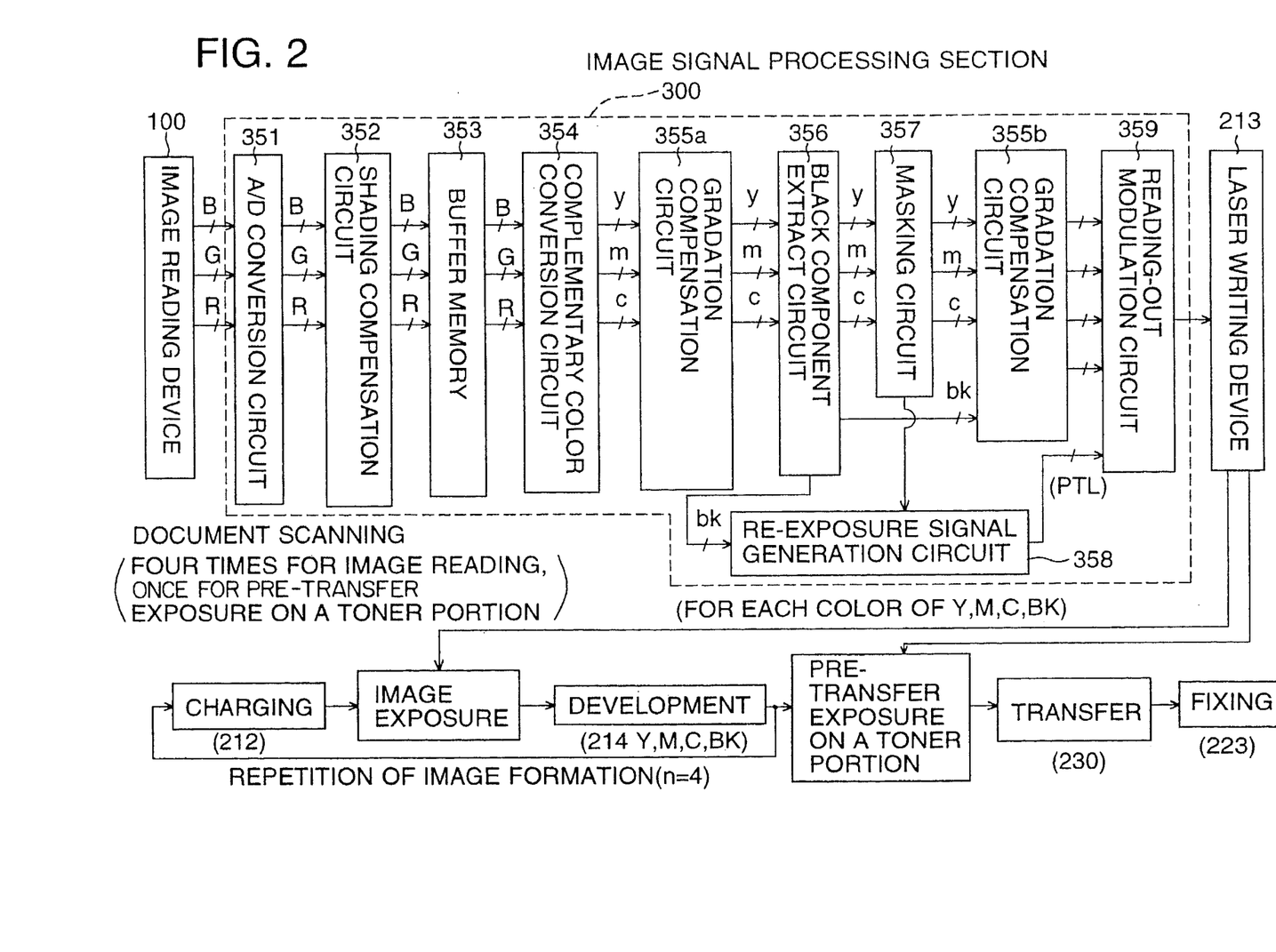
FIG. 2 is a block diagram of an image processing section shown in FIG. 1.

FIG. 1 is a view showing a general structure of a color image forming apparatus of an example of the first invention according to the present invention. In the first example, four color toner images of B, G, R, BK are formed in the manner that they are superimposed on a photoreceptor in synchronization with four individual optical scanning operations on a document, and FIG. 2 is a block diagram showing its circuits.

In FIG. 1, numeral 100 is a document reading device, and numeral 200 is an image copying apparatus in which a color image read out by the reading device 100 is recorded on transfer material.

In the reading device 100, the document placed on a platen 111 is illuminated by a halogen lamp 121 provided on a carriage 112 which slides in the horizontal direction. Mirrors 131 and 132 are provided on a movable mirror unit 113, which also slides in the horizontal direction. These mirrors introduce an optical image of the document into a lens reading section 114 in combination with a mirror 122 provided on the carriage 112.

The carriage 112 and the movable mirror unit 113 are driven by wires (not shown in the drawings) connected to a stepping motor, and the document is optically scanned when they are slid in the same direction at the velocity of V and ½ V respectively.

A lens 141 is provided in the lens reading section 114, and a color CCD 142 is provided at the image forming position at the back of the lens 141.

The document is color-separated into color image data of blue image data (B), green image data (G), and red image data (R), and outputted to an image processing section 300 which will be described later.

On the other hand, in the image copying apparatus, numeral 210 is a photoreceptor drum which is an image carrier, and, for example, an OPC photoreceptor is coated on the photoreceptor drum which is grounded and rotated clockwise. Numeral 212 on the photoreceptor drum 210 is a scorotron charger, which uniformly charges the peripheral surface of the photoreceptor drum 210 so that the potential voltage of the surface of the photoreceptor is equal to $V_H$ by a corona discharge by a grid, the potential voltage of which is maintained to be $V_G$, and a corona discharge wire. Prior to the charging operation by the scorotron charger 212, the peripheral surface of the photoreceptor is exposed by a PLC 211, in which light emitting diodes are used, in order to remove the history of the photoreceptor up to the preceding printing operation, and the peripheral surface of the photoreceptor is discharged.

After the uniform charging operation onto the photoreceptor, the image exposing operation according to the image signal is conducted by a laser writing unit 213 which is an image exposure means. In the image exposure operation, after the image signal inputted from the image reading device 100 when the document is optically scanned is processed by an image signal processing section 300 shown in FIG. 2, the signal is inputted into a laser writing unit 213 and an image formation operation is conducted on the photoreceptor.

Analog signals of document color image signals B (blue), G (green), R (red) are inputted from the image reading device 100 into the image signal processing section 300. This signal is A/D-converted by an A/D conversion circuit 351, and after that, distortions caused by the optical system and the like are removed by a shading compensation circuit 352. After that, the signal is temporarily inputted into a buffer memory 353 so that the images of B, G and R can be formed at the same position. Next, B, G, R signals outputted from the buffer memory 353 are complementary-color-converted with Y (yellow), M (magenta) and C (cyan) signals into y, m and c signals in a complementary color conversion circuit 354. After this signal is gradation-compensated in a gradation compensation circuit 355a, an under color removal operation is conducted from y, m and c data in a black element extracting circuit 356 so that a black element can be extracted and a digital signal bk of the black element can be generated. In these signals, y, m, c signals are color-corrected in a masking circuit 357, and gradation-compensated again together with the bk signal in a gradation compensation circuit 355b. A re-exposure signal generation circuit 358, into which y, m, c signals are inputted from the masking circuit 357, and the bk signal is inputted from the black element extracting circuit 356, generates a re-exposure signal r by which the re-exposure operation is conducted onto the image (toner image) portion except an image portion of the black element onto which the final image exposure operation in this example is conducted. Then, the re-exposure signal is read out together with y, m, c, and bk signals in the order of the image exposure, and for example, pulse-width-modulated in a modulation circuit 359. Then, the signal is sent to the laser writing unit 213 in timed relation with optical scanning conducted by the image reading device 100.

The laser writing unit 213 conducts scanning in the following manner: a light emitting source is composed of laser diodes not shown in the drawings; and a light beam passes through a rotating polygonal mirror 2131, an fθ lens 2132 and the like, and its optical path is deflected by a plurality of reflection mirrors 2133. The latent image (Y) is formed by a y signal outputted from the laser writing unit 213 synchronized with the first optical scanning of the image reading device 100 when the photoreceptor drum 210 is rotated (subsidiary scanning). In this example, the exposure operation is conducted on the image portion according to the image signal, and a reversal latent image is formed in the manner that the potential voltage of the image portion is equal to a low potential $V_L$.

Developing units 214, in which developers made of toners T, such as yellow (Y), magenta (M), cyan (C) and black (K), and carrier are respectively accommodated, are provided around the photoreceptor drum 210. At first, the first color developing process (Y) is carried out by a rotating developing sleeve 2141 in which a magnetic body is accommodated and by which the developer is maintained. The developer is made of carrier particles, in which ferrite is used as a core and insulating resin is coated around the core, and toner T, in which polyester is used as a main material, and pigment corresponding to the color, charge control agent, silica, titanium oxide are added to the main material. The thickness of a developer layer is regulated to 300 to 800 μm on the developing sleeve 2141 by a layer forming bar, and the developer is conveyed to a developing area.

A gap length between the developing sleeve 2141 and the photoreceptor drum 210 is equal to 0.4 to 1 mm, which is larger than the thickness of the developer layer, and an AC bias voltage $V_{AC}$ and a DC bias voltage $V_{DC}$ are superimposed and impressed upon the gap between the developing sleeve 2141 and the photoreceptor drum 210. Because the polarity of $V_{DC}$, $V_H$, and that of toner T are same, the toner T, which is given an opportunity to separate from the carrier by $V_{AC}$, is not adhered to a portion of $V_H$, the potential of which is higher than that of $V_{DC}$. However, an amount of toner corresponding to the potential difference between $V_{DC}$ and $V_L$, which is lower than $V_{DC}$, is adhered to a $V_L$ portion, and visualizing (reversal developing) is conducted.

After visualizing of the first color (Y) has been completed, the process enters into the second color image forming process. The scorotron charger 1 uniformly charges the periphery of the rotating photoreceptor drum 210, and the latent image (M) is formed by an m output signal outputted from the laser writing unit 213 synchronized with the second optical scanning of the image reading device 100. At this time, the discharge operation by the PCL 211 which has been conducted in the first color image forming process is not conducted because the toner T adhered to the first color image portion is scattered when the potential voltage around the toner T is suddenly lowered.

On the photoreceptor 210, the potential voltage of the entire surface of which is equal to $V_H$ again, the same latent image as that of the first color is formed on a portion, at which the first color image does not exist, and developed. When the exposure and developing operation is conducted again on a portion at which the first color image exists, the latent image, the potential voltage of which is $V_T$, is formed on the above-described portion by light shielding by the first color toner adhered on the surface of the photoreceptor and electric charges of toner itself, and the developing operation is conducted corresponding to the potential difference between potential voltages $V_{DC}$ and $V_T$. On the portion on which the first and second color images are superimposed, when the first color developing is conducted after the latent image, the potential voltage of which is $V_L$, has been formed, the balance of the first and second color images is lost. Therefore, sometimes an exposure amount of the first color is decreased so that the potential voltage of magenta becomes an intermediate potential voltage such as $V_H > V_M > V_L$.

The third and fourth color image forming processes are conducted in the same way as the second color process. The c output signal and bk output signal outputted from the laser writing unit 213 synchronized with the third and fourth optical scanning are thirdly and fourthly irradiated respectively onto the surface of the rotating photoreceptor drum and four color toner images are formed on the surface of the photoreceptor drum 210. Further, the fifth optical scanning of the image reading device 100 is conducted. At this time, the photoreceptor drum 210 on which the toner image is maintained is further rotated, and is not charged again. The laser scanning according to the r signal outputted from the laser writing unit 213 is conducted in synchronization with the fifth optical scanning, and the re-exposure operation is conducted on only other image portions except the finally formed image portion (B-system pre-transfer exposure on the toner portion). At the time of the fifth optical scanning, when the toner image forming sequence is in the order of Y→M→C→BK, color information corresponding to image information of three colors of Y, M, C except the final color BK is outputted from the reading out modulation circuit 359, and thereby the laser writing unit 213 is driven.

When a memory for one page (for one color) is provided in the reading out modulation circuit 359, the fifth optical scanning can be neglected. This image portion is exposed again by the laser so that electric charges on each image portion are discharged by the exposure, and transfer repelling can be prevented and superior transferring operation can be conducted in the next transfer process.

On the other hand, the recording sheet P, which is a transfer sheet, fed from a sheet feed cassette 221 by a sheet feeding mechanism 222 and a timing roller 224 in synchronization with the toner image is fed to the transfer area by a transfer belt device 230 which is a transfer means structured by a stretched transfer belt 231, and a multi-colored toner image on the peripheral surface of the photoreceptor drum 210 is collectively transferred onto the recording sheet P.

A voltage is impressed for attracting the recording sheet upon a shaft 232a of an upstream side holding roller 232 of holding rollers 232 and 233 by which the transfer belt 231 is stretched. A conductive brush 234 is provided at a position contacting with the shaft 232a through the transfer belt 231 as a charge supplying means to the recording sheet P under the grounding condition. The recording sheet P fed from the sheet feed cassette enters between the brush 234 and the transfer belt 231, electric charges are given from the brush 234 to the recording sheet P, and an attracting force is generated between the recording sheet P and the transfer belt 231. After this operation, the recording sheet P is processed as follows: the recording sheet P enters into a nip portion (transfer area) 235 formed between the photoreceptor drum 210 and the transfer belt 231; a transfer electric field is given to the recording sheet P from the rear surface of the transfer belt 231 by a corona discharger 236 or alternatively a bias roller; and the multi-colored toner image is shifted and transferred onto the recording sheet P.

After the recording sheet P holding thereon the transferred multi-colored toner image has been discharged by an AC corona discharge while the shaft 233a of a downstream side holding roller 233, by which the transfer belt 231 is stretched, has been used as an opposed electrode, or while the recording sheet P is being discharged by the AC corona discharge, the recording sheet P is separated from the transfer belt 231. Numeral 237 is a cleaning blade which removes toners adhered to the rotating transfer belt 231. The transfer belt 231 of the transfer belt device 230 is separated from the photoreceptor drum 210 rotating around the shaft 233a of the downstream side holding roller 233 during the multi-color toner image formation and the re-exposure operation.

The recording sheet P holding thereon the multi-colored toner image separated from the transfer belt device 230 is conveyed to a fixing device 223 comprising two pressing rollers in which a heater or heaters are provided in the inside of at least one roller, or at an outside position closed to the roller. When the recording sheet P is heated and pressed between the pressing rollers, the adhered toner is fused, and then, after the fused toner has been fixed on the recording sheet P, the recording sheet P is delivered to the outside of the apparatus.

The toner remaining on the peripheral surface of the photoreceptor drum 210 after transfer has been discharged by a discharger 215 using the AC corona discharger. After that, the toner comes to a cleaning device 216, which is a cleaning means, and the toner is scraped down to the cleaning device 216 by a cleaning blade 216a, which is made of rubber, and contacting with the photoreceptor, and delivered from the device by a screw or the like or stored in the device.

After the photoreceptor drum 210, from which the remaining toner has been removed by the cleaning device 216, has been exposed by a PCL 211, it is uniformly charged by a scorotron charger 212, and enters into the next image forming cycle. The cleaning blade 216a is separated from the photoreceptor surface during the multi-colored toner image formation and the re-exposure operation, and the AC discharge is not conducted by the discharger 215.

Because a page memory is not provided in the image signal processing section in the color image forming apparatus according to the first example described above, and the color image is formed when a pair of laser writing units illuminate the photoreceptor, a sufficiently economical color image forming apparatus can be provided. Further, because the pre-transfer exposure operation on the toner portion is conducted on the toner images which have been formed and superimposed on the photoreceptor, the potential voltage of toner image portions is equal to each other at the transferring time, and the transfer operation can be highly efficiently conducted, so that a high quality image can be obtained.

Figure 3:
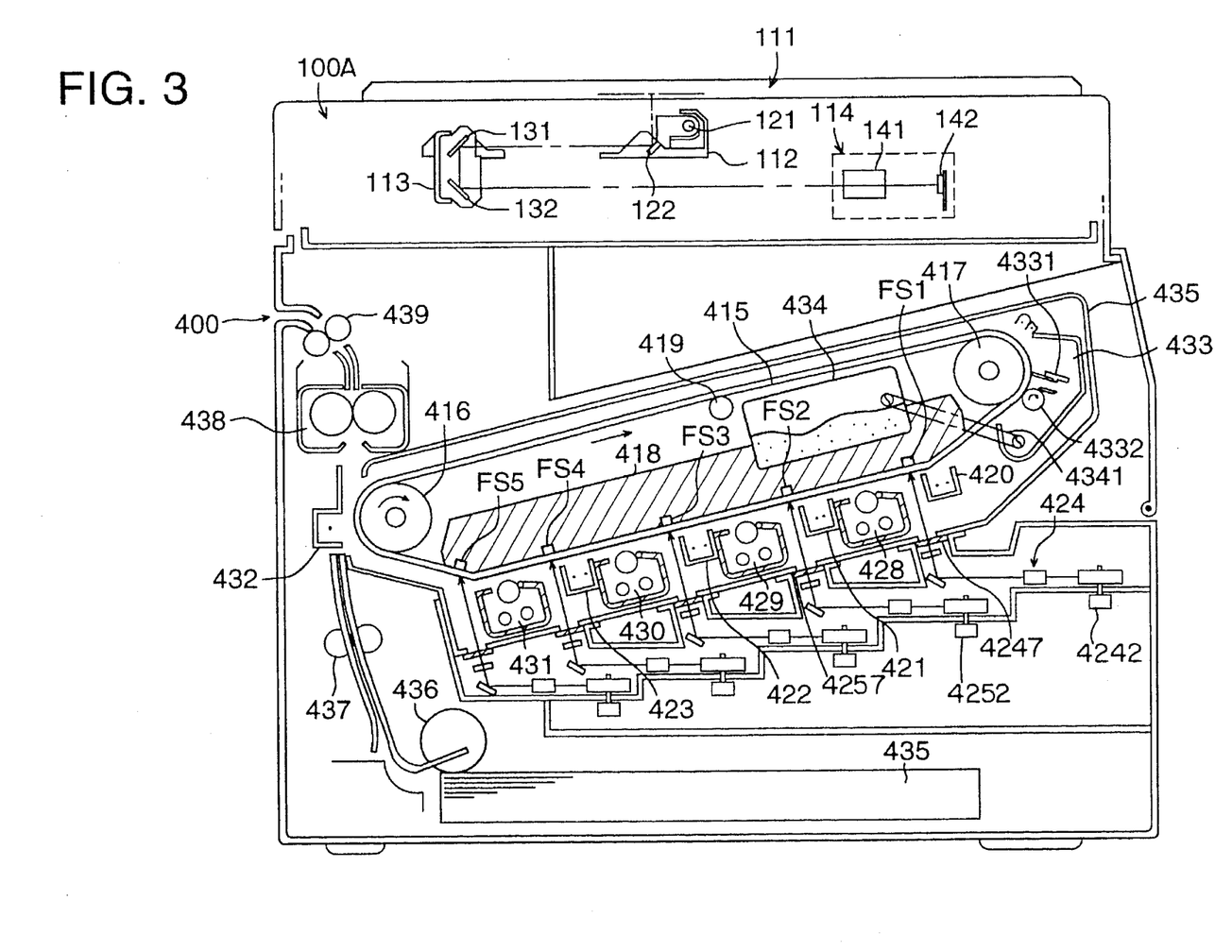
FIG. 3 is a view showing the main structure of a color copier of an example according to the second invention of the present invention.

FIG. 3 shows a main structure of a color copier which is a color image forming apparatus with a belt-shaped image forming body as an example according to the second invention of the present invention. The color copier has a page memory for four pages in which all of recording signals of at least four colors of y, m, c, bk are stored, and four color toner images are superimposed on the photoreceptor by one optical scanning and a color image is formed. When the color copier is roughly divided, the color copier is structured by an image reading device 100 and an image copying apparatus 400. In this connection, the image copying apparatus 400 of the color image forming apparatus of this example is provided with an image forming means comprising a plurality of charging means, a plurality of exposure means and developing means in which four different color toners are loaded, which are provided around the belt-shaped image forming body. When the belt-shaped image forming body is rotated by one revolution, toner images of black, cyan, magenta and yellow are superimposed so that a color image is formed, and after that, a pre-transfer exposure operation is conducted on the toner portion.

Because an image reading device 100A shown in FIG. 3 has approximately the same structure as that of the image reading device 100 of the first example shown in FIG. 1, it is shown by the same symbols and the explanation is neglected. The image copying apparatus 400 will be explained as follows according to FIG. 4 which is a perspective view of the belt and FIG. 5 which is a view showing the arrangement and structure of a laser writing unit.

Figure 4:
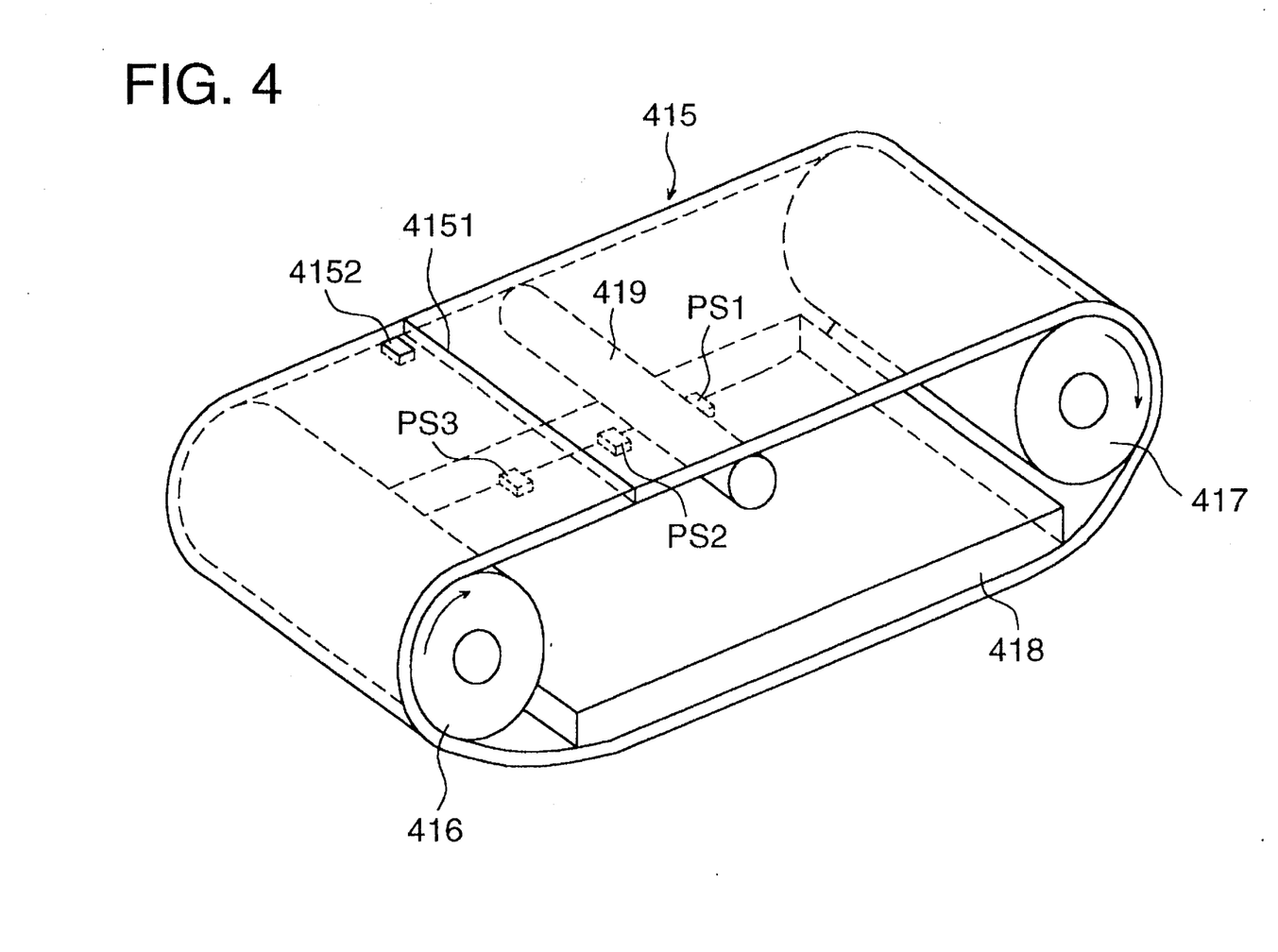
FIG. 4 is a perspective view of a photoreceptor belt shown in FIG. 3.

A belt-shaped image forming body 415 is structured as follows: the belt-shaped image forming body 415 is provided with a guide member 418 having the curvature between rotating rollers 416 and 417; a belt-shaped photoreceptor (which will be called a photoreceptor belt, hereinafter) 415, in which a photoconductive body is coated, evaporated, or equipped on a flexible belt, is stretched between rotating rollers 416 and 417; tension is given to the photoreceptor belt 415 by a tension roller 419; the belt is rotated while the belt is being slidingly contacted with the guide member 418 which is used as a reference in the lateral direction; and thereby, the surface of the photoreceptor belt 415 is always held at a predetermined position and the belt is conveyed. Due to the foregoing structure, the photoreceptor on the outer surface of the photoreceptor belt 415 is always held at a predetermined position with respect to the surface of the guide member 418 even when the belt is conveyed. Here, because a stable image forming surface with large curvature can be broadly structured in the direction of width, a large number of image forming means with the same shape can be arranged in parallel with a predetermined interval. Further, the distance from the writing means, which will be described later, and the developing means to the photoreceptor belt 415 can be kept constant by the guide member 418, so that a stable and superior image can be formed.

In the photoreceptor belt 415, a register mark 4152 which transmits the laser beam through a transmission hole or through a transmission hole to which a light transmitting film is adhered is formed at a location of an upstream side in a primary scanning direction which is located at a predetermined distance from a joint portion 4151 of both ends of the photoreceptor surface of the photoreceptor belt 415 as shown in FIG. 4, wherein the register mark 4152 is formed at a position opposed to a photosensor which will be described later. The register mark 4152 is a reference which is used for detecting an exposure starting position in the primary and secondary scanning directions when the photosensor is used for detecting the joint portion. As shown in the drawing, recessed portions are formed in both ends of the guide member 418, and photosensors PS1 to PS5 are positioned in the recessed portions as a light detecting means. Photosensors PS1 to PS5 detect the laser beam which is an exposure light emitted from the writing means and passes through the register mark as the transmission light. Of course, a reflection member may be provided on the photoreceptor belt 415 as a register mark so that the photosensor receives the reflected light of the exposure light.

In this example, although the photoreceptor belt 415 is used as an image forming body, the present invention is not limited to the example, and can be also applied to the existing image forming body having a photoreceptor layer such as the photoreceptor drum.

A plurality of charging means, a plurality of writing means, developing means in which four color different toners are loaded, a transfer means and a cleaning means are provided around the photoreceptor belt 415.

The charging means is provided so that a photoreceptor layer on the surface of the photoreceptor belt 415 is uniformly charged with a predetermined polarity, and the existing chargers 420 to 423 such as a corona charger, and a scorotron charger are used as the charging means.

The writing means is composed of laser writing units 424 to 427, in which semiconductor lasers are used, and the surface of the photoreceptor belt 415 charged by chargers 420 to 423 is exposed by a laser beam so that an electrostatic latent image is formed. A laser writing unit 491 is provided so that a pre-transfer exposure is conducted on the toner portion. When only one to three of four colors of Y, M, C, and BK are recorded, any of the laser writing units 424 to 427 can be used for the pre-transfer exposure operation on the toner portion. Further, when four color images are recorded, the following may be conducted: the photoreceptor belt is further rotated by one revolution before the transfer operation; and any of laser writing units 424 to 427 conducts the pre-transfer exposure operation on the toner portion.

The developing means comprises four developing units 428 to 431 in which color toners of, for example, black (BK), cyan (C), magenta (M), and yellow (Y) are respectively accommodated. These developing units 428 to 431 have a function in which electrostatic latent images on the photoreceptor belt 415 are visualized into toner images by a non-contact developing method. This non-contact developing method, which is different from a contact developing method, does not damage the toner image formed on the photoreceptor belt 415, and does not prevent the photoreceptor belt 415 from moving, so that a superior color image can be obtained.

The transfer means transfers the toner image formed on the photoreceptor belt 415 onto a transfer sheet by a transfer unit 432 such as a transfer corona discharger and the like. The transfer unit 432 may be replaced with an existing transfer member such as a transfer drum, and the transfer member may be used as the transfer means.

The cleaning means 433 is provided with a cleaning blade 4331 and a cleaning roller 4332, and is contacted with the surface of the photoreceptor belt 415 with pressure only at the time of cleaning operation so that the surface of the photoreceptor belt 415 can be cleaned.

A collection box 434 is used for collecting and storing therein the toner remaining on the photoreceptor belt 415, from which the toner has been removed by the cleaning means 433, through a toner collection pipe 4341.

In this example, process units, that is, the photoreceptor belt 415, chargers 420 to 423, developing units 428 to 431 in which color toners are respectively accommodated, the cleaning means 433 and the toner collection box 434, by which the image forming section is constructed, are integrally assembled to a cartridge 435 so that they are formed into one unit, and they are collectively attached to and detached from the apparatus main body.

Figure 6:
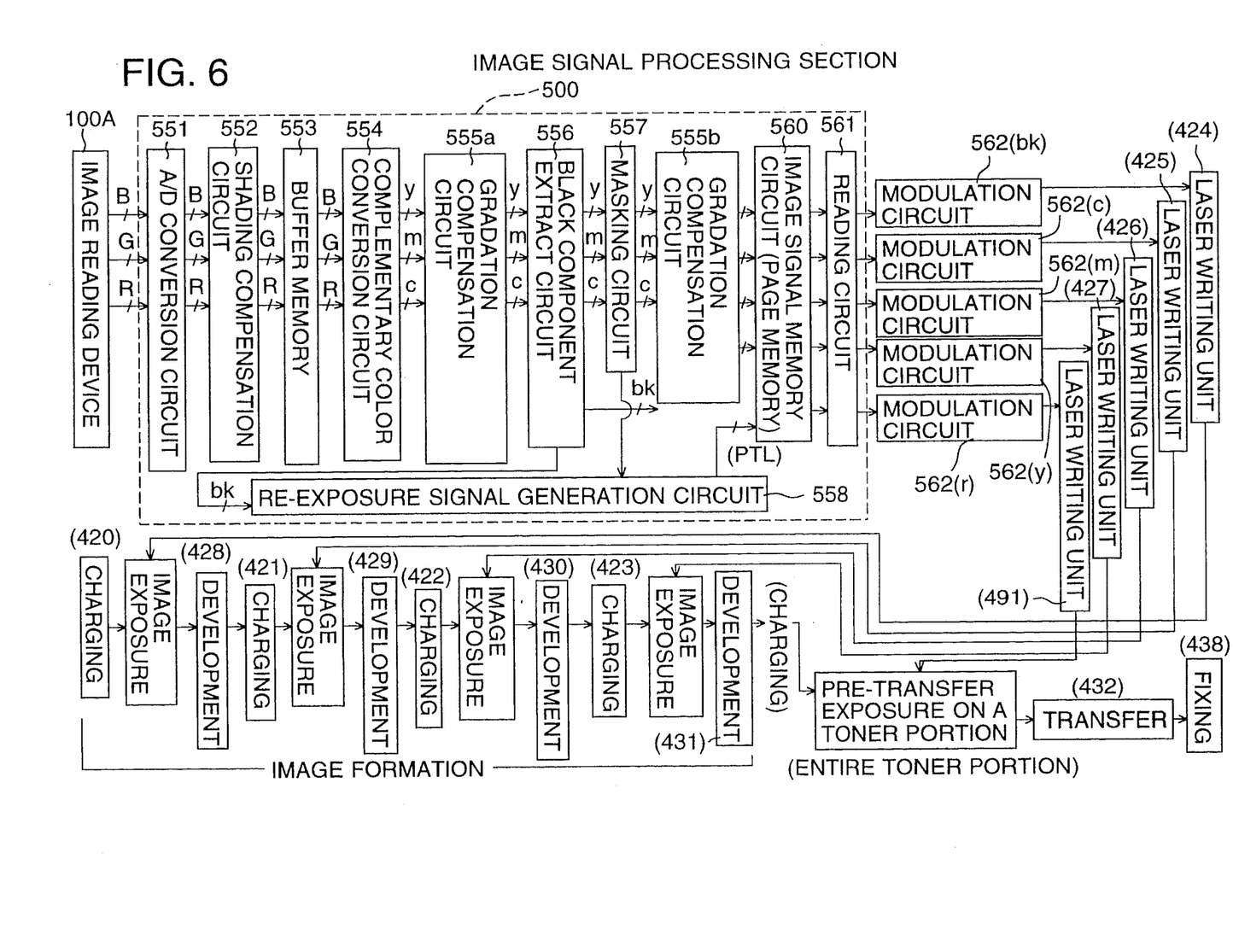
FIG. 6 is a block diagram of the image processing section shown in FIG. 3.

The color image forming process is conducted by the image copying apparatus described above. As shown in FIG. 6, after the image signal obtained by the first optical scanning of the image reading device 100A has been processed by the image signal processing section 500, the latent image formation of Y, M, C, BK is conducted on the photoreceptor belt 415 by laser writing units 424 to 427. Before the transfer operation, pre-transfer exposure on the toner portion is conducted on the toner portion adhered to the photoreceptor by the laser writing unit 491.

Analog signals of document color image signals B (blue), G (green), R (red) are inputted from the image reading device 100A into the image signal processing section 500. This signal is A/D-converted by an A/D conversion circuit 551, and after that, distortions caused by optical system and the like are removed by a shading compensation circuit 552. After that, the signal is temporarily inputted into a buffer memory 553 so that the images of B, G and R can be formed at the same position. Next, B, G, R signals outputted from the buffer memory 553 are complementary-color-converted with Y (yellow), M (magenta) and C (cyan) signals into y, m and c signals in a complementary color conversion circuit 554. After this signal is gradation-compensated in a gradation compensation circuit 555*a*, an under color removal operation is conducted on y, m and c data in a black element extracting circuit 556 so that a black element can be extracted and a digital signal bk of the black element can be generated. In these signals, y, m, c signals are color-corrected in a masking circuit 557, and gradation-compensated again together with the bk signal in a gradation compensation circuit 555*b*. A re-exposure signal generation circuit 558, into which y, m, c signals are inputted from the masking circuit 557, and the bk signal is inputted from the black element extracting circuit 556, generates a re-exposure signal r by which the re-exposure operation is conducted onto the entire image (toner image) portion in the example. The signal r is stored in an image signal memory circuit 560, which has a memory capacity larger than that of one page (page memory), as an 8 bit image data together with the y, m, c and bk signals. A reading-out circuit 561 is provided for the following reason: Because mounting positions of the laser writing units 424 to 427 and 491 are different from each other, it is necessary for the reading-out circuit to respectively delay the time of writing onto the photoreceptor corresponding to the positions of laser writing units; and it is necessary that the signals of y, m, c, bk and r stored in the image signal memory circuit 560 are read out. For example, image formation signals read out in the order of image exposure are pulse-width-modulated in a modulation circuit 562 and sent out to laser writing units 424 to 427 and 491.

Figure 5:
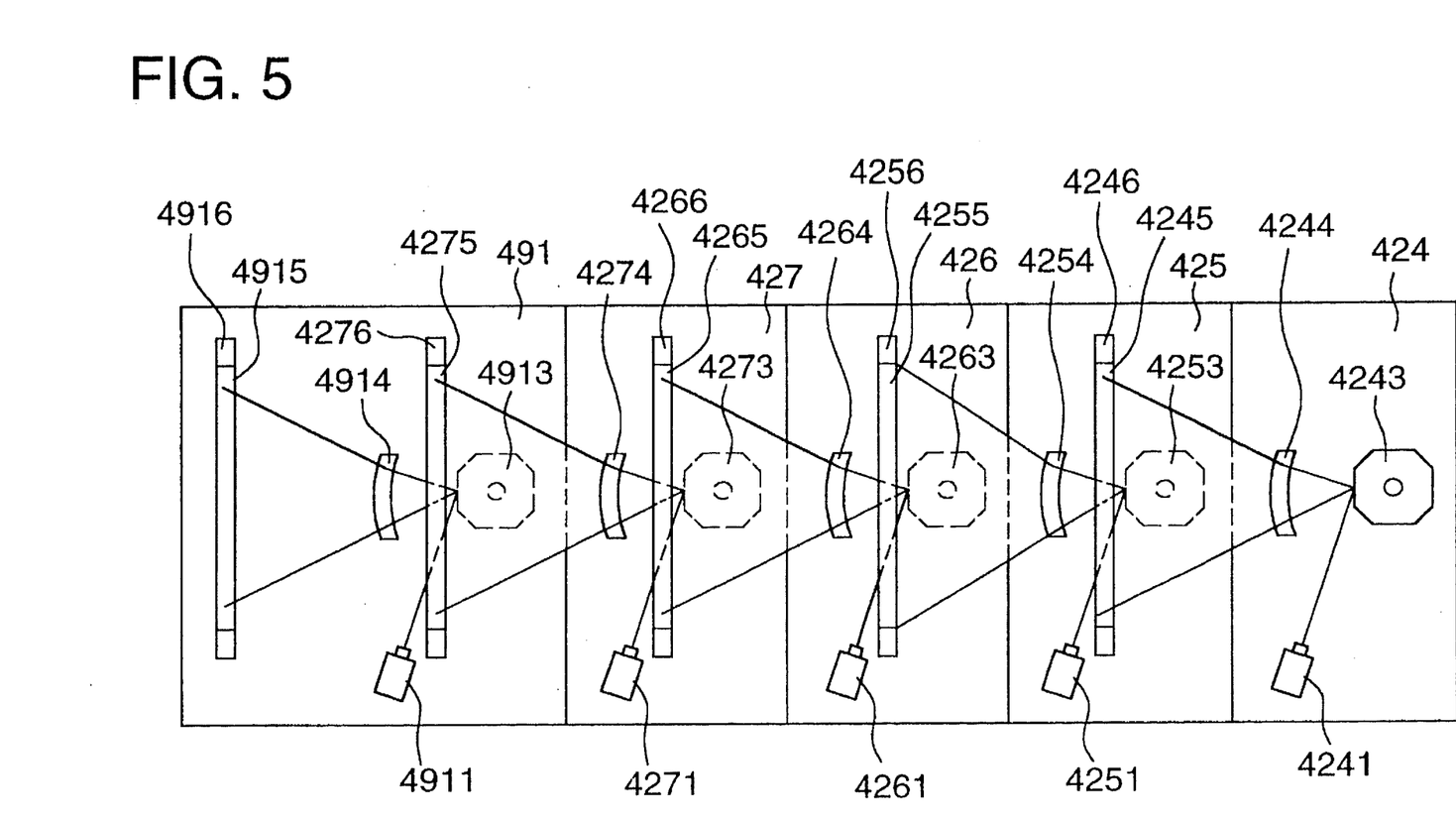
FIG. 5 is a view showing the structure in which a laser writing unit shown in FIG. 3 is positioned.

At first, when the first color image signal outputted from the image signal processing section 500 is inputted into the laser writing unit 424, a laser beam is generated by a semiconductor laser 4241 in the laser writing unit 424. The laser beam is used for rotary scanning by a polygonal mirror 4243 rotated by a driving motor 4242, and passes through an fθ lens 4244, a mirror 4245, a cylindrical lens 4246 and a dust proof glass 4247. Then, the laser beam is projected onto the peripheral surface of the photoreceptor belt 415 to which a predetermined electrical charge has been uniformly given by a charger 420 and forms a bright line thereon.

On the other hand, concerning the subsidiary scanning direction, the photosensor PS1 detects the register mark 4152 corresponding to a specified position on the photoreceptor belt 415. When this detection signal is used as a reference, modulation of the laser beam emitted from the semiconductor laser 4241 by the image signal is started, and a main scanning line is determined. When scanning is started in the primary scanning direction, the laser beam is detected by the photosensor PS1, and when the detection signal is used as a reference, modulation of the laser beam emitted from the semiconductor laser 4241 is started by the first color image signal. The modulated laser beam scans the surface of the photoreceptor belt 415. Accordingly, a latent image corresponding to the first color is formed on the surface of the photoreceptor belt 415, which has been uniformly charged, by the primary scanning using the laser beam and the subsidiary scanning by the conveyance of the photoreceptor belt 415. The latent image is developed by a developing unit 428 in which black toner is accommodated, and a black toner image is formed on the surface of the photoreceptor belt 415. Then, the photoreceptor belt 415 is conveyed while the black toner image is being maintained on the surface of the photoreceptor belt; and enters into the second color image forming process.

That is, when the photoreceptor belt 415 on which the black toner image has been formed is conveyed to the position of the next charger 421 in the same way as the case of the above-described first color image signal, the photoreceptor belt is charged again by the charger 421. Then, the photosensor PS2 detects the register mark 4152 corresponding to a specified position on the photoreceptor belt 415. When this detection signal is used as a reference, modulation of the laser beam emitted from the semiconductor laser in the laser writing unit 425 by the second color image signal is started. A laser beam is generated by a semiconductor laser 4251 in the laser writing unit 425 and the laser beam is used for rotary scanning by a polygonal mirror 4253 rotated by a driving motor 4252, and passes through an fθ lens 4254, a mirror 4255, a cylindrical lens 4256 and a dust proof glass 4257. Then, the laser beam is projected onto the peripheral surface of the photoreceptor belt 415 to which a predetermined electrical charge has been uniformly given by the charger 421 and a latent image is formed thereon. The latent image is developed as the second color by the developing unit 429 in which cyan toner is accommodated. The cyan toner image is formed under the condition that the already formed black toner image exists.

In the same way as the foregoing, the photoreceptor belt 415 on which the first and second colors, that is, the black toner image and the cyan toner image have been formed is further conveyed. In the same way as the case of the second color image signal, the photoreceptor 415 is uniformly charged in succession by a charger 422, and a latent image is formed by a laser writing unit 426 which is a writing means. The latent image is developed by a developing unit 430 in which magenta toner is accommodated, and a magenta toner image is formed. Further, the photoreceptor belt 415 on which the third color, that is, the magenta toner image has been formed is further conveyed. In the same way as the case of the second and third color image signals, the photoreceptor 415 is uniformly charged in succession by a charger 423, and a latent image is formed by a laser writing unit 427. The latent image is developed by a developing unit 431 in which yellow toner is accommodated. The yellow toner image is superimposed on the foregoing toner images, and a color toner image is formed on the surface of the photoreceptor belt 415. That is, while the photoreceptor belt 415 is rotated by one revolution, the color toner image is formed.

DC and AC bias voltages are impressed upon these developing units 428 to 431, and non-contact reversal development (jumping development) is conducted on the photoreceptor belt 415, the base of which is grounded. In this connection, any of one and two component developers can be used for the non-contact development. When one component developer is used, it is not necessary to provide a toner density control means, and a size of the apparatus can be reduced. However, the developing method using the two component developer is superior to that using the one component developer in view of the stability of development, and is preferable in view of color reproduction.

Onto the color toner image formed on the photoreceptor belt 415, uniform charging is conducted before the transfer process by the charger (this charging process can be neglected, and therefore, in the case of the color copier according to the example shown in FIG. 3, the uniform charging by the charger is neglected). The pre-transfer exposure on the toner portion is conducted onto the toner adhered portion of the entire toner image portion on the photoreceptor belt 415, on which uniform charging has been conducted, from above the adhered toner by the laser writing unit 491 (A-system pre-transfer exposure on the toner portion). The pre-transfer exposure on the toner portion is conducted as follows: a re-exposure pattern is formed in the manner that toner image recording signal positions of y, m, c, and bk are superimposed by a re-exposure signal generation circuit 558; the pattern is stored once in the image signal memory circuit 560 in the page memory; and after that, the pattern is read out by the reading-out circuit 561 and stored in the laser writing unit 491. The reading-out operation by the reading-out circuit 561 is conducted as follows: the photosensor PS5 detects the register mark 4152 corresponding to the specified position on the photoreceptor belt 415; the stored signal is read out when the detection signal is used as the reference; and the modulation process of the laser beam emitted from the semiconductor laser writing unit 491 is started by the re-exposure signal.

As described above, the color toner image, which has been formed on the surface of the photoreceptor belt 415, and on which the pre-transfer exposure on the toner portion has been conducted, is transferred onto a transfer sheet, which is fed from a sheet feed cassette 435 by a sheet feed roller 436, and which is synchronized with the color toner image by a timing roller 437. A high voltage with polarity opposite to the toner is impressed upon the sheet by the transfer unit 432 for the transfer operation.

In this way, the transfer sheet onto which a color toner image has been transferred is positively separated from the photoreceptor belt 415 when the movement direction of the photoreceptor is suddenly changed (small curvature). After the toner has been fused and fixed onto the sheet by a fixing means 438, the sheet is delivered from the apparatus by a delivery roller 439.

The photoreceptor belt 415 from which the color toner image has been transferred onto the transfer sheet is further conveyed clockwise. The remaining toner on the photoreceptor is removed and cleaned by a cleaning means 433 in which a cleaning blade 4331 and a cleaning roller 4332 are contacted with the photoreceptor belt with pressure. After the cleaning process has been completed, the apparatus enters into a new image forming process.

As described above, in a color image forming apparatus in which toner images of a plurality of colors are superimposed on the photoreceptor so that a color image is formed by the image exposure, and color toner images are collectively transferred onto a transfer sheet, when the pre-transfer exposure is conducted on a toner portion, a stable and high quality color image, which is not affected by environmental variation, can be obtained.

What is claimed is:

1. An apparatus for forming a desired color toner image, comprising:

an image reader for outputting three kinds of color image signals by scanning an image;

a signal processor for converting the three kinds of image signals into four kinds of recording signals of Y, M, C, and BK, the image reader conducting the scanning for each of the four kinds of recording signals so that the image reader conducts the scanning on the same image four times in first to fourth scannings;

a photoreceptor on which the desired color toner image is formed;

a first exposure device for conducting an image exposure on the photoreceptor on the basis of each of the four kinds of recording signals in synchronization with the scanning of the image reader so as to form a latent image for each of the four kinds of recording signals;

a developing device for developing each of the latent images with a corresponding one of Y, M, C, and BK color developers so as to form the desired color toner image composed of Y, M, C, and BK color toner images on the photoreceptor;

a transfer device for transferring the desired color toner image from the photoreceptor onto a recording sheet; and a controller for controlling a second exposure device to conduct a pre-transfer image exposure on the full color toner image on the photoreceptor on the basis of the recording signals after the fourth scanning which forms a fourth color toner image of the Y, M, C, and BK color toner images, but before transferring the desired color toner image.

2. The apparatus of claim 1, wherein the image reader further conducts a fifth scanning on the same image after the fourth scanning, and the pre-transfer image exposure is conducted in synchronization with the fifth scanning.

3. The apparatus of claim 1, further comprising a memory to store the recording signals, wherein the pre-transfer image exposure is conducted on the basis of the recording signals stored in the memory.

4. The apparatus of claim 1, wherein the first exposure device is used as the second exposure device.

5. An apparatus for forming a desired color toner image, comprising:

an image reader for outputting three kinds of color image signals by scanning an image;

a signal processor for converting the three kinds of image signals into four kinds of recording signals of Y, M, C, and BK;

a memory for storing the four kinds of recording signals;

a photoreceptor on which the desired color toner image is formed;

a first exposure device for conducting an image exposure on the photoreceptor on the basis of each of the four kinds of recording signals in the memory so as to form a latent image for each of the four kinds of recording signals;

a developing device for developing each of the latent images with a corresponding one of Y, M, C, and BK color developers so as to form the desired color toner image composed of Y, M, C, and BK color toner images on the photoreceptor;

a transfer device for transferring the desired color toner image from the photoreceptor onto a recording sheet; and a controller for controlling a second exposure device to conduct a pre-transfer image exposure on the desired color toner image on the photoreceptor on the basis of at least one of the recording signals in the memory after forming a fourth color toner image of the Y, M, C, and BK color toner images, but before transferring the desired color toner image.

6. The apparatus of claim 5, wherein the first exposure device comprises four sets of exposure members corresponding to the four recording signals.

* * * * *